United States Patent
Takashiro et al.

(10) Patent No.: US 9,301,376 B2
(45) Date of Patent: Mar. 29, 2016

(54) STROBE LIGHTING UNIT

(71) Applicant: Stanley Electric Co., Ltd., Tokyo (JP)

(72) Inventors: Eiji Takashiro, Tokyo (JP); Hiroaki Ohashi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 14/745,409

(22) Filed: Jun. 20, 2015

(65) Prior Publication Data
US 2015/0373819 A1 Dec. 24, 2015

(30) Foreign Application Priority Data
Jun. 23, 2014 (JP) ................... 2014-127902

(51) Int. Cl.
*H05B 37/02* (2006.01)
*H05B 41/32* (2006.01)
*H05B 37/03* (2006.01)
*G03B 15/05* (2006.01)

(52) U.S. Cl.
CPC .............. *H05B 41/325* (2013.01); *G03B 15/05* (2013.01); *H05B 37/03* (2013.01)

(58) Field of Classification Search
CPC .............................. H05B 41/326; H05B 37/04
USPC ................................. 315/151, 152, 291, 294
See application file for complete search history.

(56) References Cited

U.S. PATENT DOCUMENTS

| | | | | |
|---|---|---|---|---|
| 6,295,413 | B1* | 9/2001 | Ogasawara | G03B 15/05 327/101 |
| 2004/0051163 | A1* | 3/2004 | Kawano | H01L 23/49562 257/584 |
| 2008/0175580 | A1* | 7/2008 | Kita | G03B 7/16 396/164 |
| 2009/0256488 | A1* | 10/2009 | Philiben | H05B 41/2887 315/241 S |

FOREIGN PATENT DOCUMENTS

| | | |
|---|---|---|
| JP | 7-159232 A | 6/1995 |
| JP | 2007-109551 A | 4/2007 |
| JP | 2009-53320 A | 3/2009 |
| JP | 2010-14782 A | 1/2010 |

* cited by examiner

*Primary Examiner* — Don Le
(74) *Attorney, Agent, or Firm* — Kenealy Vaidya LLP (57) ABSTRACT

A strobe lighting unit including a detecting circuit can reliably detect degradations of a xenon light source, which can flash as a light source for devices having a shooting with camera such as a smart phone, etc. The strobe lighting unit can include at least one xenon discharge tube as the xenon light source and at least one lighting circuit to flash the xenon discharge tube. The strobe lighting unit can also include at least one light-detecting circuit to detect degradations of the xenon discharge tube without a photo detector by monitoring an anode electrode of the xenon discharge tube at a flash thereof, and can be configured to output the monitoring result into the devices. Thus, the strobe lighting unit can result in an increase in the possible range of the devices, and can be employed for various devices including a thin mobile phone, a thin smart phone, etc.

20 Claims, 7 Drawing Sheets

STROBE LIGHTING UNIT

This application claims the priority benefit under 35 U.S.C. §119 of Japanese Patent Application No. 2014-127902 filed on Jun. 23, 2014, which is hereby incorporated in its entirety by reference.

BACKGROUND

1. Field

The presently disclosed subject matter relates to strobe lighting units having a xenon light source, and more particularly to strobe light units with a simple structure including a detecting circuit that can reliably detect degradations of the xenon light source, and which can also detect a non-lighting of xenon discharge tube in the xenon light source in confidence.

2. Description of the Related Art

Into devices having a shooting with camera such as a smart phone, a mobile phone, a digital camera, etc. a strobe light unit having a flash light such as a xenon light source is generally incorporated. In such the devices, when the flash light degrades due to temporal charge of an electrode, a discharge gas and the like or when the flash light becomes non-functional in the worst case, a favorable picture should not be taken by using the shooting with camera of the devices.

Figure 7:
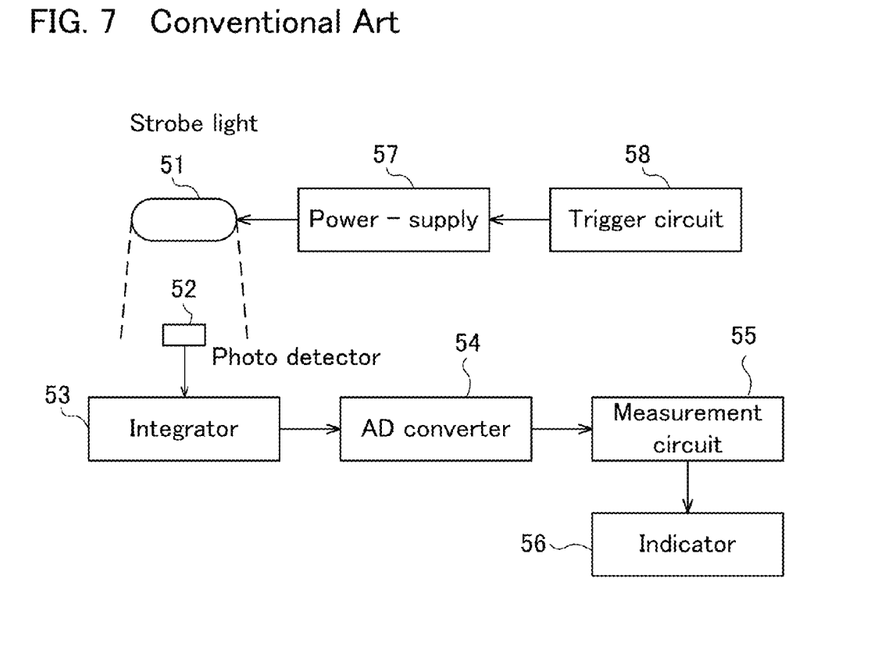
FIG. 7 is a block diagram showing a conventional detecting circuit of a degradation of strobe light.

Hence, strobe light units including a detecting circuit that can detect a degradation of strobe light have been developed. A conventional detecting circuit of the degradation of strobe light, for example, is disclosed in Patent document No. 1 (Japanese Patent Application Laid Open JPH07-159232). FIG. 7 is a block diagram showing a conventional detecting circuit of the degradation of strobe light, which is disclosed in Patent document No. 1.

The conventional detecting circuit of the degradation of strobe light includes: a strobe light 51; a power supply 57 configured to light the strobe light 51; a trigger circuit configured to output a lighting signal to the power supply 57 so as to be able to flash the strobe light 51; a photo detector 52 receiving a flash light emitted from the strobe light 51; an integrator 53 configured to detect an amount of the light received by the photo detector 52; an AD converter 54 converting analog data of the amount of the light into digital data; a measurement circuit 55 measuring whether the amount of the light is normal or not; and an indicator 55 displaying said result output from the measurement circuit 55.

However, when the strobe light 51 degrades in the conventional detecting circuit, the detecting circuit may have a question, which has potential of missing a certain detection of the degradation of the strobe light 51 due to variations of the amount of the flash light emitted from the strobe light 51. Especially, when the strobe light 51 includes a plurality of xenon discharge tubes and when the amount of the flash light emitted from the strobe light 51 decreases because of a degradation of only one xenon discharge tube, the conventional detecting circuit may have another question, which has potential of missing a certain detection of the degradation of the strobe light 51 due to a variation of an amount of flash lights emitted from other xenon discharge tubes, which normally operate.

In addition, the conventional detecting circuit needs the photo detector 52 to receive the flash light emitted from the strobe light 51, and therefore may be subject to a complex structure because a space is required to incorporate the photo detector 52 into the devices having a shooting with camera such as a smart phone, a mobile phone, a digital camera, and the like and because the devices are small size. Moreover, the conventional detecting circuit may decrease a detecting accuracy of the degradation of the strobe light 51 due to a slightly misalignment of the photo detector 52.

The above-referenced Patent document and additional Patent documents are listed below and are hereby incorporated with their English abstracts in their entireties.

1. Patent document No. 1: Japanese Patent Application Laid Open JP H07-159232
2. Patent document No. 2: Japanese Patent Application Laid Open JP2010-014782
3. Patent document No. 3: Japanese Patent Application Laid Open JP2009-053320
4. Patent document No. 4: Japanese Patent Application Laid Open JP2007-109551

The disclosed subject matter has been devised to consider the above and other problems, characteristics and features. Thus, an embodiment of the disclosed subject matter can include a strobe light unit using a xenon light source with a simple structure that can detect a degradation of the xenon light source without a photo detector. In this case, the strobe light unit can light the xenon light source with a simple structure, and also can detect degradations including a non-lighting of the xenon light source without a photo detector. Thus, the strobe light unit can result in an increase in the possible range of devices having the shooting with camera, and therefore can be employed for various devices including a thin mobile phone, a thin smart phone, etc.

SUMMARY

The presently disclosed subject matter has been devised in view of the above and other characteristics, desires, and problems in the conventional art. An aspect of the disclosed subject matter can include providing strobe light units including a detecting circuit without a photo detector, which can reliably detect degradations including a non-lighting of a xenon light source composed of a single xenon discharge tube, and which can result in an increase in the possible range of devices having the shooting with camera. Another aspect of the disclosed subject matter can include providing strobe light units including a detecting circuit without a photo detector, which can reliably detect degradations including a non-lighting of a xenon light source that is composed of a plurality of xenon discharge tubes, and which can be employed for various devices including a thin mobile phone, a thin smart phone, etc.

According to an aspect of the disclosed subject matter, a strobe lighting unit can include: a xenon discharge; a lighting circuit connected between an anode electrode and a cathode electrode of the xenon discharge tube, and configured to flash the xenon discharge tube; a switching element connected to the lighting circuit, configured to input an external lighting signal into a gate thereof, and configured to operate the lighting circuit to flash the xenon discharge tube in accordance with the external light signal input into the gate thereof; a timing generator configured to receive the external lighting signal into an input thereof, and configured to generate a pulse having a light-detecting time from an output thereof; a light-detecting circuit, an input of the light-detecting circuit connecting the anode electrode of the xenon discharge tube, and the light-detecting circuit configured to generate a light-emitting signal from an output of the light-detecting circuit when the xenon discharge tube flashes; a logical multiply circuit, each of inputs of the logical multiply circuit connecting the output of the timing generator and the output of the light-detecting circuit; and wherein the strobe lighting unit monitors a degradation of the xenon discharge tube in accordance with an output signal output from the output of the logical multiply circuit.

In the above-described exemplary strobe lighting units, the lighting unit can further include a latch circuit, in which an input thereof is connected to the output of the logical multiply circuit and the latch circuit is configured to maintain said monitoring signal for the degradation of the xenon discharge tube in an output thereof, and also can further include a booster circuit connecting to the lighting circuit via a diode. The switching element can be an isolating gate bipolar transistor (IGBT), and also the timing generator can include two integrators. In this case, each of the two integrators can be composed of a resistance and a capacitor, and at least one of outputs of the two integrators can be connected to a waveform shaping circuit. Additionally, the light-detecting circuit can include a capacitor connecting to the anode of the xenon discharge tube, and in this case, the light-detecting circuit can also include a bipolar transistor so that a collector thereof can be used as the output of the light-detecting circuit. Moreover, the light-detecting circuit can monitor a falling edge of the anode of the xenon discharge tube to detect the degradation of the xenon discharge tube.

According to another aspect of the disclosed subject matter, a strobe lighting unit can include a strobe light source including a plurality of xenon discharge tubes. In this case, the strobe light unit can include the same number of each of the lighting circuits, the switching elements and the light-detecting circuits described above as that of the xenon discharge tubes. In addition, the strobe light unit including the strobe light source can also include at least one of the features described in the immediately above paragraph.

According to the aspects of the disclosed subject matter, the above-described exemplary strobe lighting units can flash at least one xenon discharge tube with at least one the lighting circuit, and can reliably detect degradations including a non-lighting of the at least one xenon discharge tube by monitoring a falling edge of an anode electrode of the xenon discharge tube at a flash of the xenon discharge tube without a photo detector. Thus, the disclosed subject matter can provide strobe light units that can result in an increase in the possible range of devices having the shooting with camera, and therefore can be employed for various devices including a thin mobile phone, a thin smart phone, etc.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Figure 1:
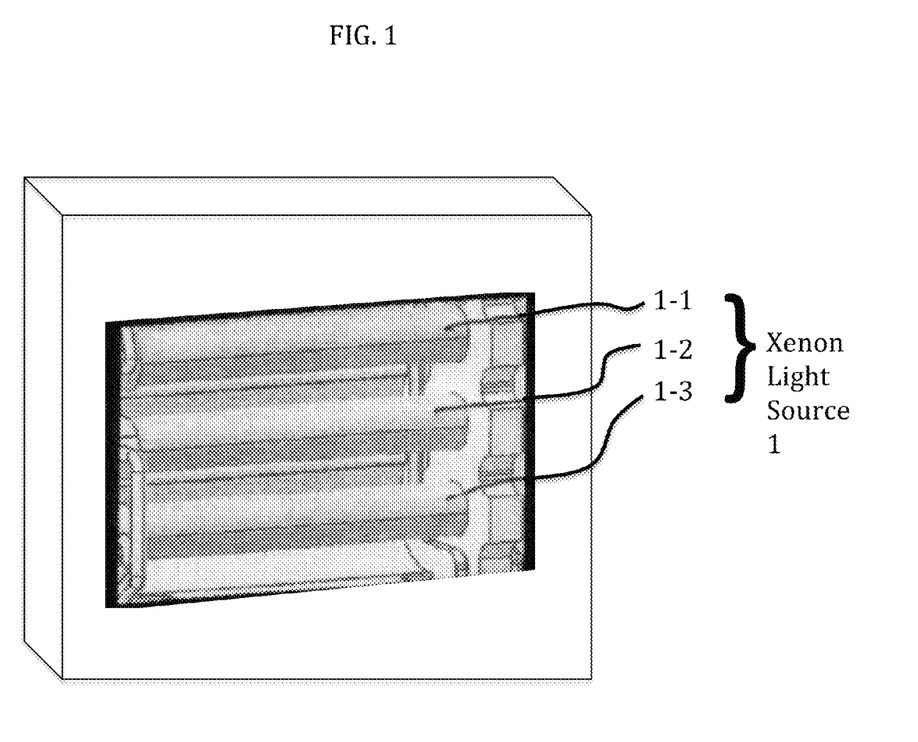
FIG. 1 is a perspective view showing an exemplary embodiment of a xenon light source used for a strobe lighting unit made in accordance with principles of the disclosed subject matter.

The disclosed subject matter will now be described in detail with reference to FIG. 1 to FIG. 6, in which the same or corresponding elements use the same reference marks. FIG. 1 is a perspective view showing an exemplary embodiment of a xenon light source used for a strobe lighting unit made in accordance with principles of the disclosed subject matter. The xenon light source 1 can include a first xenon discharge tube 1-1, a second xenon discharge tube 1-2 and a third xenon discharge tube 1-3, in which each of first xenon discharge tube 1-1, the second xenon discharge tube 1-2 and the third xenon discharge tube 1-3 can flash in a respective one different direction at once. The xenon light source 1 can also include only the first xenon discharge tube 1-1 as now described in later.

Figure 2:
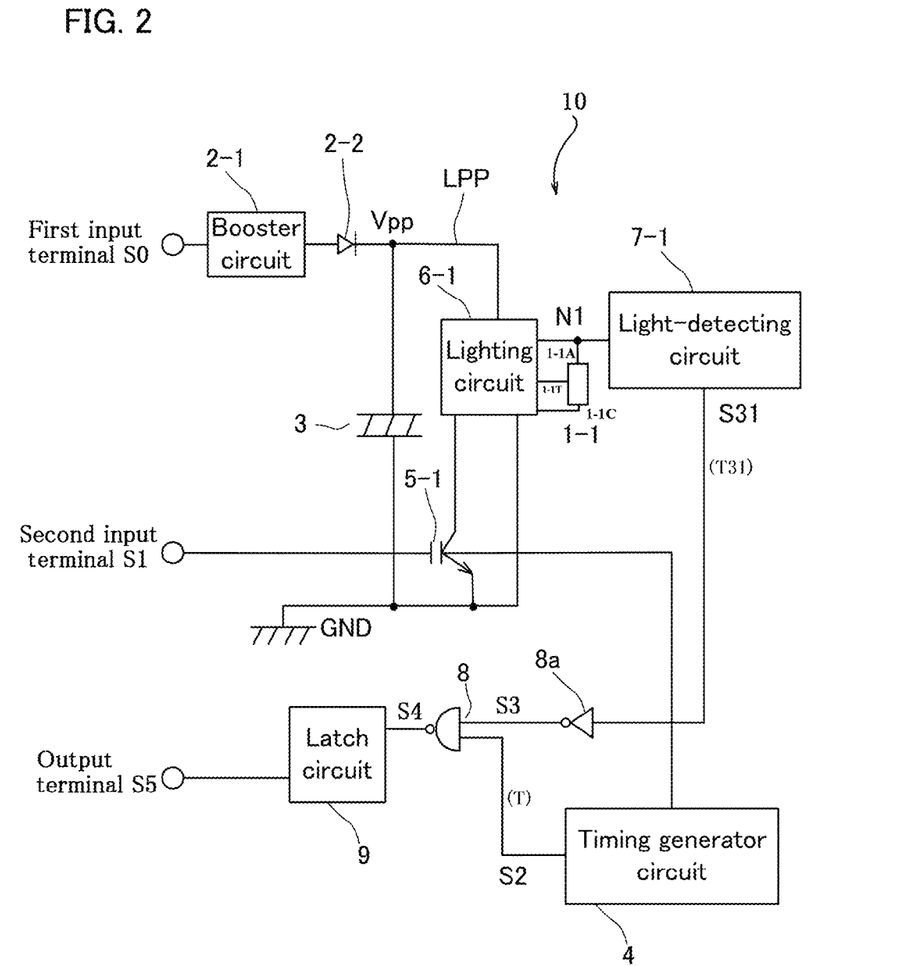
FIG. 2 is a block diagram showing a first exemplary embodiment of the strobe lighting unit when the xenon light source shown in FIG. 1 is composed of a single xenon discharge tube.

FIG. 2 is a block diagram showing a first exemplary embodiment of the strobe lighting unit when the xenon light source shown in FIG. 1 is composed of a single xenon discharge tube (the first xenon discharge tube 1-1). The strobe lighting unit 10 of the first embodiment can includes: a first input terminal S0 being configured to receive a charging signal output from the above-described devices having a shooting with camera such as a smart phone, a mobile phone, etc.; a second input terminal S1 being configured to receive a lighting signal output from the devices having the shooting with camera; a booster circuit 2-1 being configured to charge a high voltage Vpp (e.g., approximately 3,000 voltages) into a capacitor 3, which is connected between a high voltage line LPP and ground GND, via a diode 2-2 in accordance with the charging signal input from the first input terminal S0; a first switching element 5-1, which is, for example, an isolating gate bipolar transistor (IGBT), being configured to operate a first lighting circuit 6-1 by inputting the lighting signal input from the second input terminal S1 into a gate thereof; and therefore the first xenon discharge tube 1-1 being configured to flash by using the first lighting circuit 6-1 and the first switching element 5-1 in accordance with the lighting signal input from the second input terminal S1 after the strobe lighting unit 10 inputs the charging signal from the first input terminal S0.

In addition, the strobe lighting unit 10 can also includes: a first light-detecting circuit 7-1 being configured to generate a first light-emitting signal having the light-emitting time T31 of the first xenon discharge tube 1-1 from an output S31 thereof when the first xenon discharge tube 1-1 flashes; an inverter 8a inverting the first light-emitting signal having the first light-emitting time T31 into a third signal S3; a timing generator circuit 4 being configured to generate a pulse having a light-detecting time T from an output S2 thereof so that the light-detecting time T becomes shorter than the first light-emitting time T31; a NAND gate 8 inputting the pulse having the light-detecting time T and the third signal S3; and a latch circuit 9 inputting a fourth signal S4 output from the NAND gate 8, and being configured to output data of the latch circuit 9 from an output terminal S5 as an operating signal of the first xenon discharge tube 1-1.

In the first embodiment described above, as the booster circuit 2-1, a general MOSFET typed chopper circuit can be used, and the MOSFET can also be replaced with the IGBT in the booster circuit 2-1. As the lighting circuit 6-1, a general resonance circuit using a capacitor, a coil and the like can be used for the strobe lighting unit 10, and also lighting circuits used for various strobe lighting units, which are disclosed in Patent documents No. 2 to No. 4 that are owned by Applicant of this disclosed subject matter, can be used. Accordingly, detail descriptions of the lighting circuit 6-1 are abbreviated here.

Figures 3A, 3B:
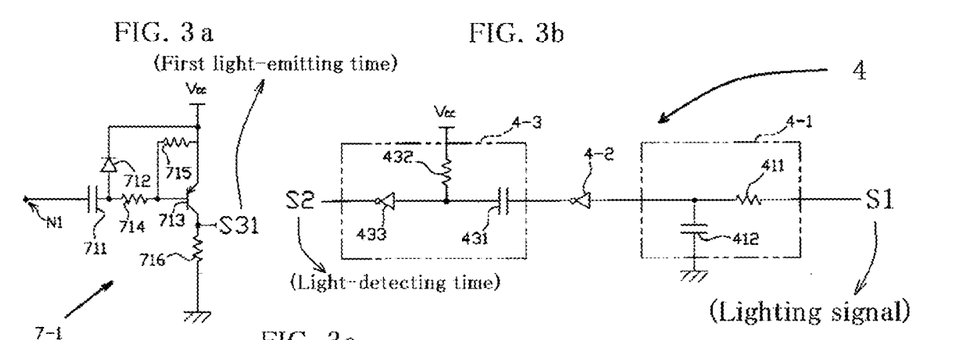
FIGS. 3(a) and 3(b) are circuit diagrams showing exemplary embodiments of a light-detecting circuit and a timing generator circuit shown in FIG. 2, respectively.
Figure 3C:
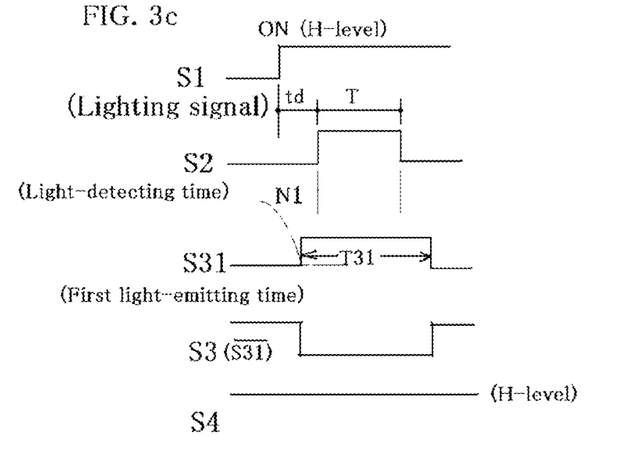
FIG. 3(c) is a timing chart in the first exemplary embodiment when the strobe lighting unit normally operates.

FIGS. 3a and 3b are circuit diagrams showing exemplary embodiments of the light-detecting circuit 7-1 and the timing generator circuit 4 shown in FIG. 2, respectively, and FIG. 3c is a timing chart in the first exemplary embodiment when the strobe lighting unit 10 normally operates. A specific exemplary embodiment of a detecting operation without a photo detector, which can reliably detect degradations including a non-lighting of the first xenon discharge tube 1-1, will now be described with reference to FIG. 3a to FIG. 3c.

When the second input terminal S1 receives the lighting signal ON, for example, H-level signal of approximately 5 voltages when Vcc is set up at 5 voltages, the timing generator circuit 4, which includes a first integrator 4-1 and a second integrator 4-3 connecting the first integrator 4-1 via an inverter 4-2 that is used as a waveform shaping for a waveform output from the first integrator 4-1, can generate the light-detecting time T, which maintains H-level during the light-detecting time T in accordance with a time constant of a capacitor 431 and a resistance 432 via an inverter 433 that is used as a waveform shaping for a waveform output from the second integrator 4-3 after delaying a delay time td in accordance with a time constant of a resistance 411 and a capacitor 412, from the output S2 of the timing generator circuit 4 as shown in FIG. 3b and FIG. 3c.

Accordingly, the ON signal of the lighting signal input from the second input terminal S1 can be used as a trigger signal for the timing generator circuit 4-1, and the timing generator circuit 4-1 can operates as a one-shot pulse generator by using the trigger signal. Hence, the timing generator circuit 4-1 cannot be limited to the exemplary circuit shown in FIG. 3b, for example, can also be configured with a flip-flop IC, etc. In these cases, the light-detecting time T needs to be set up at a shorter time than the first light-emitting time T31 as described in detail later.

In addition, when the second input terminal S1 receives the lighting signal ON as described above, the first switching element 5-1 can operate the first lighting circuit 6-1 so as to flash the first xenon discharge tube 1-1 because the ON signal of the lighting signal is input into the gate of the first switching element 5-1 and thereby the first switching element 5-1 turns on. Accordingly, the first xenon discharge tube 1-1 can flash by applying a high voltage (e.g. approximately 4,000 to 5,000 voltages) to a trigger electrode 1-1T of the first xenon discharge tube 1-1 while applying the high voltage Vpp between an anode electrode 1-1A and a cathode electrode 1-1C of the first xenon discharge tube 1-1 as shown in FIG. 2.

In this case, because a discharge current flows between the anode electrode 1-1A and the cathode electrode 1-1C of the first xenon discharge tube 1-1, the first xenon discharge tube 1-1 can flash. Additionally, because the discharge current drastically increases and exponentially decreases, a first node N1 (the anode electrode 1-1A) of the first xenon discharge tube 1-1 can drastically drop from the high voltage to an approximately ground GND level at a flash of the first xenon discharge tube 1-1 as shown in FIG. 3c.

Therefore, the output S31 of the first light-detecting circuit 7-1 can rise at H-level (approximately Vcc) in a delayed fashion from the ON signal of the lighting signal (S1) due to a time constant of a capacitor 711 and a resistance 714, and can drop at L-level (approximately GND level) when a base current of a transistor 713 charged into the capacitor 711. Thereby, the first light-detecting circuit 7-1 can generate the first light-emitting signal having the first light-emitting time T31 from the output S31 thereof, that is, from a collector of the transistor 713, so that the light-emitting time T31 becomes longer than the light-detecting time T, which is output from the output S2 of the timing generator circuit 4, when the first xenon discharge tube 1-1 normally flashes. In this case, a diode 712 may operate for an overvoltage protection to Vcc, and each of resistances 715 and 716 can operate for protections between the base and an emitter of the transistor 713 and for a protection of an over current between the collector and the emitter of the transistor 713, respectively.

Accordingly, the fourth signal S4 can be an output signal of the NAND gate 8, in which input signals are the output S2 of the timing generator circuit 4 and the third signal S3 of the output of the inverter 8a, and therefore can keep H-level as shown in FIG. 3c. Additionally, because the fourth signal S4 can be an input signal of the latch circuit 9, the output terminal S5 can maintain at L-level. That is to say, when the first xenon discharge tube 1-1 normally flashes, the output terminal S5 can output L-level signal to the devices having shooting with camera such as a smart phone, a mobile phone, etc. Cases where the first xenon discharge tube 1-1 does not normally flash and details of the latch circuit 9 will now be described in a second exemplary embodiment of the strobe lighting unit.

Figure 4A:
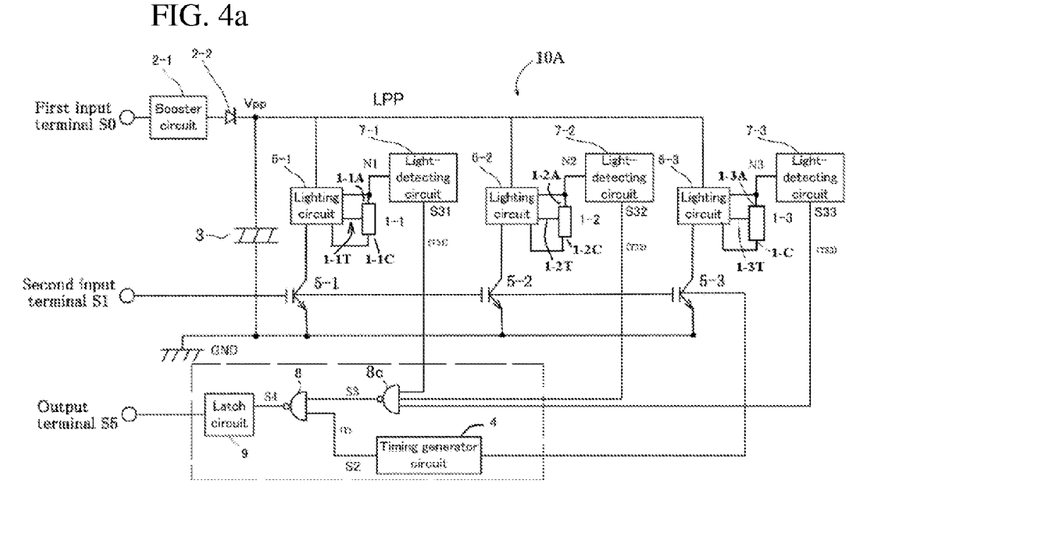
FIG. 4a is a block diagram showing a second exemplary embodiment of the strobe lighting unit when the xenon light source is composed of a plurality of xenon discharge tubes.
Figure 4B:
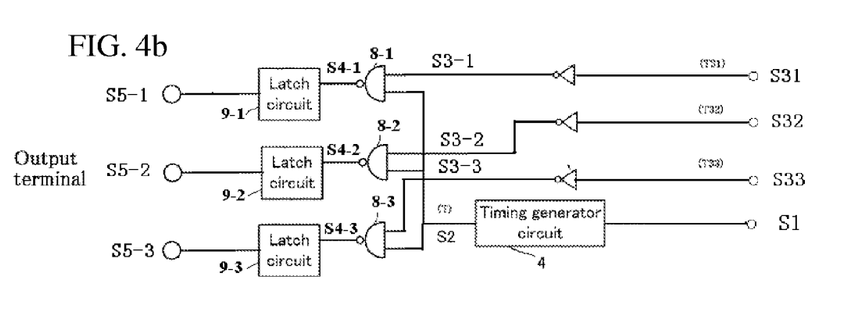
FIG. 4b is a block diagram showing an exemplary variation of the second embodiment, wherein the block diagram shows only different parts from the second embodiment.

The second exemplary embodiment of the strobe lighting unit of the disclosed subject matter relates to cases where the xenon light source 1 is composed of a plurality of xenon discharge tubes. FIG. 4a is a block diagram showing the second exemplary embodiment of the strobe lighting unit when the xenon light source 1 is composed of three xenon discharge tubes as shown in FIG. 1, and FIG. 4b is a block diagram showing an exemplary variation of the second embodiment, wherein the block diagram shows only different parts, which can be replaced with a rectangular dotted line region shown in FIG. 4a, from the second embodiment.

The strobe lighting unit 10A of the second embodiment can includes: the first input terminal S0 being configured to receive the charging signal output from the devices having a shooting with camera such as a smart phone, a mobile phone, etc., the second input terminal S1 being configured to receive the lighting signal output from the devices having the shooting with camera, and the booster circuit 2-1 being configured to charge the high voltage Vpp (e.g., approximately 3,000 voltages) into the capacitor 3, which is connected between the high voltage line LPP and ground GND, via the diode 2-2 in accordance with the charging signal input from the first input terminal S0 in common with the first embodiment; the first switching element 5-1, a second switching element 5-2 and a third switching element 5-3, which are, for example, the IGBT, each of the switching elements 5-1, 5-2 and 5-3 being configured to operate the first lighting circuit 6-1, a second lighting circuit 6-2 and a third lighting circuit 6-3 by inputting the lighting signal input from the second input terminal S1 into a gate thereof, respectively; and therefore each of the first xenon discharge tube 1-1, the second xenon discharge tube 1-2 and the third xenon discharge tube 1-3 being configured to flash by using the first lighting circuit 6-1 and the first switching element 5-1, the second lighting circuit 6-2 and the second switching element 5-2 and the third lighting circuit 6-3 and the third switching element 6-3 in accordance with the lighting signal input by the second input terminal S1 after the strobe lighting unit 10A inputs the charging signal from the first input terminal S0, respectively.

In addition, the strobe lighting unit 10A can also includes: each of the first light-detecting circuit 7-1, a second light-detecting circuit 7-2 and a third light-detecting circuit 7-3 being configured to generate the first light-emitting signal having the first light-emitting time T31 of the first xenon discharge tube 1-1 from the output S31, a second light-emitting signal having a second light-emitting time T32 of the second xenon discharge tube 1-2 from the output S32 and a third light-emitting signal having a third light-emitting time T33 of the third xenon discharge tube 1-3 from the output S33 when each of the first xenon discharge tube 1-1, the second xenon discharge tube 1-2 and the third xenon discharge tube 1-3 flashes, respectively; an NAND gate 8c inputting the first light-emitting signal having the first light-emitting time T31, the second light-emitting signal having the second light-emitting time T32 and the third light-emitting signal having the third light-emitting time T33, and outputting the third signal S3; the timing generator circuit 4 being configured to generate the pulse having the light-detecting time T from the output S2 thereof so that the light-detecting time T becomes shorter than each of the first light-emitting time T31, the second light-emitting time T32 and the third light-emitting time T33; the NAND gate 8 inputting the pulse having the light-detecting time T and the third signal S3 output from the NAND gate 8c, and outputting the fourth signal S4; and the latch circuit 9 inputting the fourth signal S4 output from the NAND gate 8, and being configured to output data of the latch circuit 9 from the output terminal S5 as an operating signal of the xenon light source 1, which is composed of the first xenon discharge tube 1-1, the second xenon discharge tube 1-2 and the third xenon discharge tube 1-3.

In the second embodiment in common with the first embodiment, the general MOSFET typed chopper circuit can be used as the booster circuit 2-1, and the MOSFET can also be replaced with the IGBT in the booster circuit 2-1. The general resonance circuit using the capacitor, the coil and the like can be used as the lighting circuits 6-1, 6-2 and 6-3 for the strobe lighting unit 10A, and also the lighting circuits used for the strobe lighting units, which are disclosed in Patent documents No. 2 to No. 4, can be used as the lighting circuits 6-1, 6-2 and 6-3 for the strobe lighting unit 10A.

Operations of the second exemplary embodiment when the xenon light source normally operates will now be described with reference to FIG. 5 in addition to FIG. 4a. When the second input terminal S1 receives the lighting signal ON (e.g., H-level), the timing generator circuit 4 can generate the pulse having the light-detecting time T, which maintains H-level during the light-detecting time T after delaying the delay time td from the lighting signal ON input from the second input terminal S1 in common with the first embodiment.

In addition, when the second input terminal S1 receives the lighting signal ON as described above, each of the first switching element 5-1, the second switching element 5-2 and the third switching element 5-3 can operate the first lighting circuit 6-1, the second lighting circuit 6-2 and the third lighting circuit 6-3 so as to flash the first xenon discharge tube 1-1, the second discharge tube 1-2 and the third discharge tube 1-3, respectively, because the ON signal of the lighting signal is input to each of the gates of the first switching element 5-1, the second switching element 5-2 and the third switching element 5-3 and thereby each of the first switching element 5-1, the second switching element 5-2 and the third switching element 5-3 turns on.

Consequently, each of the first xenon discharge tube 1-1, the second xenon discharge tube 1-2 and the third xenon discharge tube 1-3 can flash by applying the high voltage (e.g. approximately 4,000 to 5,000 voltages) to a respective one of the trigger electrodes 1-1T, 1-2T and 1-3T of the first, second and third xenon discharge tubes 1-1, 1-2 and 1-3 while applying the high voltage Vpp between the anode electrode 1-1A and the cathode electrode 1-1C of the first xenon discharge tube 1-1, between an anode electrode 1-2A and an cathode electrode 1-2C of the second xenon discharge tube 1-2 and between an anode electrode 1-3A and a cathode electrode 1-3C of the third xenon discharge tube 1-3 as shown in FIG. 4a.

In these cases, each of the first xenon discharge tube 1-1, the second xenon discharge tube 1-2 and the third xenon discharge tube 1-3 can flash, because each of discharge currents flows between the anode electrode 1-1A and the cathode electrode 1-1C of the first xenon discharge tube 1-1, between the anode electrode 1-2A and the cathode electrode 1-2C of the second xenon discharge tube 1-2 and between the anode electrode 1-3A and the cathode electrode 1-3C of the third xenon discharge tube 1-3. Additionally, because each of the discharge currents drastically increases and exponentially decreases, each of the first node N1 (the anode electrode 1-1A) of the first xenon discharge tube 1-1, an second node N2 (the anode electrode 1-2A) of the second xenon discharge tube 1-2 and a third node N3 (the anode electrode 1-3A) of the third xenon discharge tube 1-3 can drastically drop from the high voltage to an approximately ground GND level at each of flashes of the first, second and third xenon discharge tubes 1-1, 1-2 and 1-3, respectively, as described in the first embodiment.

Figure 5:
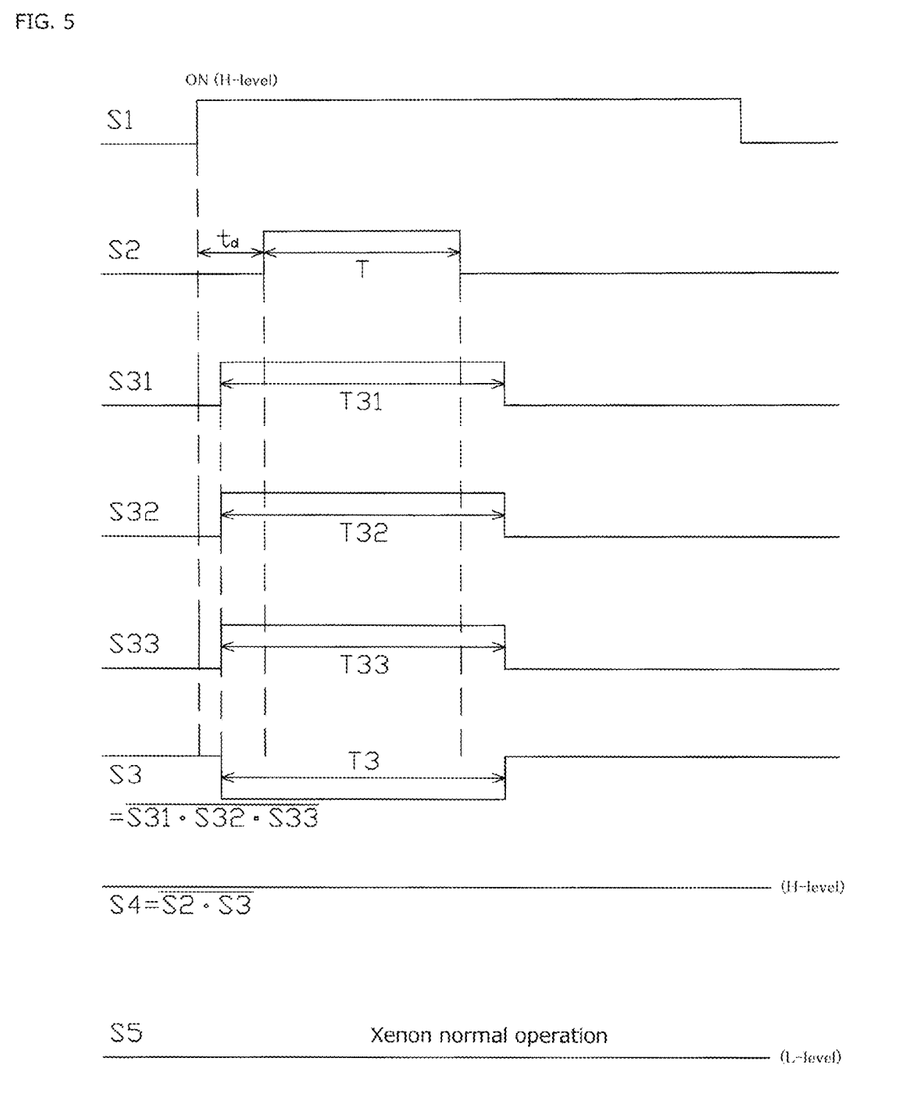
FIG. 5 is a timing chart in the second exemplary embodiment when the strobe lighting unit normally operates.

Accordingly, as shown in FIG. 5, each of the output S31 of the first light-detecting circuit 7-1, the output S32 of the second light-detecting circuit 7-2 and the output S33 of the third light-detecting circuit 7-3 can rise at H-level (approximately Vcc) in the delayed fashion from the ON signal of the lighting signal (S1), and can drop at L-level (approximately GND level). Thereby, each of the first light-detecting circuit 7-1, the second light-detecting circuit 7-2 and the third light-detecting circuit 7-3 can generate the first light-emitting signal having the light-emitting time T31 from the output S31 thereof, the second light-emitting signal having the light-emitting time T32 from the output S32 thereof and the third light-emitting signal having the light-emitting time T33 from the output S33 thereof, respectively, so that each of the first light-emitting time T31, the second light-emitting time T32 and the third light-emitting time T33 becomes longer than the light-detecting time T (output from the output S2) when each of the first xenon discharge tube 1-1, the second xenon discharge tube 1-2 and the third xenon discharge tube 1-3 normally flashes.

Each of the first light-emitting signal having the light-emitting time T31 from the output S31, the second light-emitting signal having the light-emitting time T32 from the output S32 and the third light-emitting signal having the light-emitting time T33 from the output S33 can be input into a respective one of the inputs of the NAND gate 8c, and the NAND gate 8c can output the third signal S3. Each of the third signal S3 and the pulse having the light-detecting time T output from the output S2 of the timing generator circuit 4 can be input into a respective one of the inputs of the NAND gate 8, and the fourth signal S4 can be output as the output signal of the NAND gate 8 as shown in FIG. 4*a*. Accordingly, the fourth signal S4 can keep H-level as shown in FIG. 5.

Moreover, because the fourth signal S4 can be input as the input signal of the latch circuit 9, the output terminal S5 can maintain at L-level as shown in FIG. 5. Therefore, when the xenon light source 1, which is composed of the plurality of xenon discharge tubes (e.g., the first xenon discharge tube 1-1, the second xenon discharge tube 1-2 and the third xenon discharge tube 1-3 shown in FIG. 1 and FIG. 4*a*), normally flashes, the output terminal S5 can output L-level signal to the devices having shooting with camera such as a smart phone, a mobile phone, a digital camera, etc.

Next, cases where the xenon light source 1, which is composed of the first xenon discharge tube 1-1, the second xenon discharge tube 1-2 and the third xenon discharge tube 1-3 as shown in FIG. 4*a*, does not normally flash, will now be described with reference to FIG. 6. As described above, each of the first xenon discharge tube 1-1, the second xenon discharge tube 1-2 and the third xenon discharge tube 1-3 can flash by applying the high voltage to the respective one of the trigger electrodes 1-1T, 1-2T and 1-3T of the first, second and third xenon discharge tubes 1-1, 1-2 and 1-3 while applying the high voltage Vpp between the anode electrode 1-1A and the cathode electrode 1-1C of the first xenon discharge tube 1-1, between the anode electrode 1-2A and the cathode electrode 1-2C of the second xenon discharge tube 1-2 and between the anode electrode 1-3A and the cathode electrode 1-3C of the third xenon discharge tube 1-3.

Figure 6:
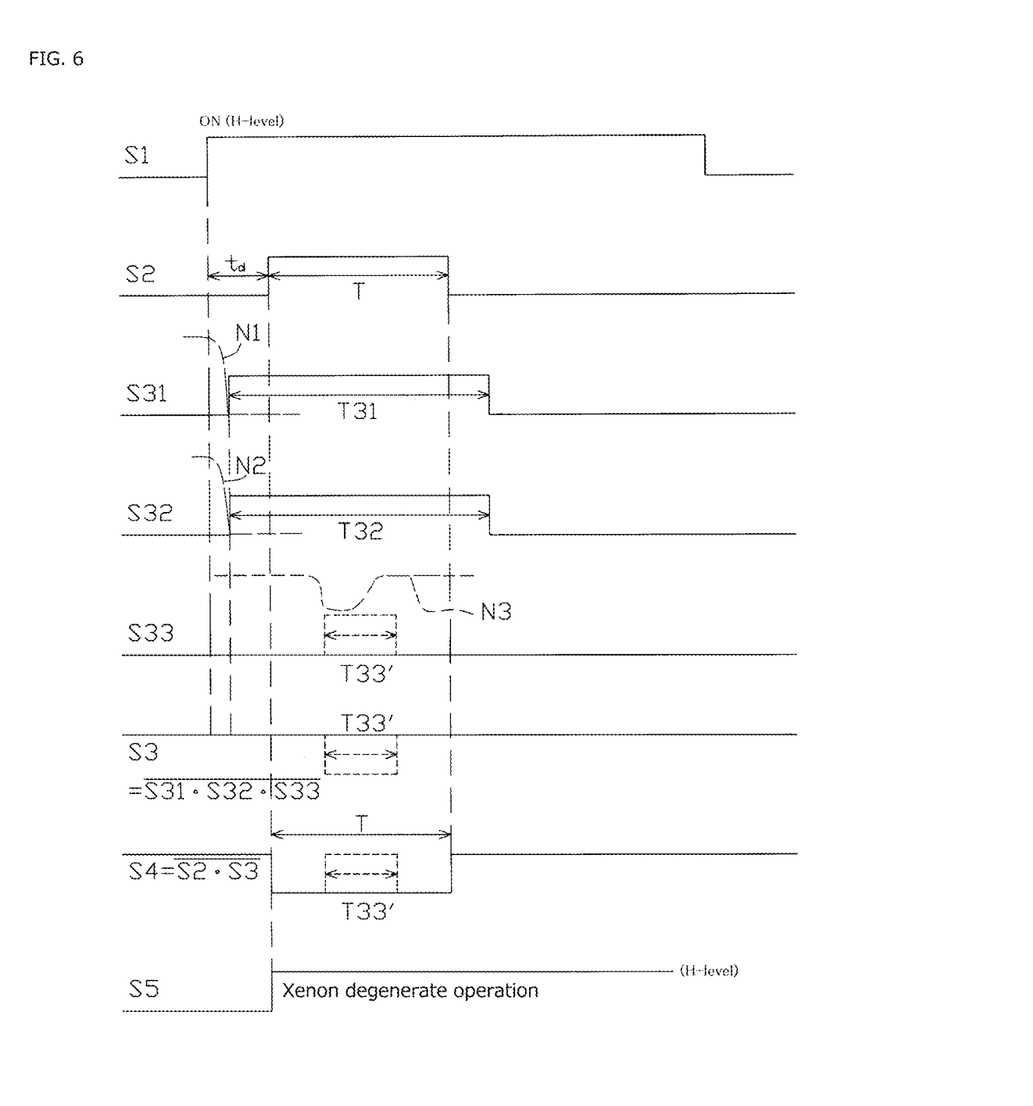
FIG. 6 is a timing chart in the second exemplary embodiment when the strobe lighting unit does not normally operate.

In these cases, when each of the first xenon discharge tube 1-1, the second xenon discharge tube 1-2 and the third xenon discharge tube 1-3 can flash, each of the first node N1 of the first xenon discharge tube 1-1 and the second node N2 of the second xenon discharge tube 1-2 can drastically rise at the high voltage with the respective one flash of the first xenon discharge tube 1-1 and the second xenon discharge tube 1-2 and can exponentially drop as shown in the timing chart of FIG. 6.

However, for example, if the third xenon discharge tube 1-3 does not normally flash, although the third node N3 of the third xenon discharge tube 1-3 may drastically rise at the high voltage, the third node N3 may not exponentially drop at the L-level because an impedance between the anode electrode 1-3A and the cathode electrode 1-3C of the third xenon discharge tube 1-3 may increase due to degrades of the discharge tube 1-3. Accordingly, although each of the output S31 of the first light-detecting circuit 7-1 and the output S32 of the second light-detecting circuit 7-2 can rise at H-level in the delayed fashion from the ON signal of the lighting signal (S1), and can drop at L-level, however, the output S33 of the third light-detecting circuit 7-3 may rise at H-level later than the output S31 of the second light-detecting circuit 7-2 and the output S32 of the third light-detecting circuit 7-3 from the ON signal of the lighting signal (S1), and may drop at L-level earlier than the output S31 of the second light-detecting circuit 7-2 and the output S32 of the third light-detecting circuit 7-3, as shown in a timing chart for S33 of FIG. 6.

Accordingly, when the third xenon discharge tube 1-3 does not normally flash, the third light-emitting time T33' of the third light-emitting signal output from the third light-detecting circuit 7-3 can become shorter than the light-detecting time T output from the output S2 of the timing generator circuit 4. When the third xenon discharge tube 1-3 does not absolutely flash, the impedance between the anode electrode 1-3A and the cathode electrode 1-C of the third xenon charge tube 1-3 may become a high impedance enough to stop the charge current into the third xenon charge tube 1-3. Hence, because the third node N3 of the third xenon charge tube 1-3 may maintain at a high voltage, the third light-emitting time T33' of the third light-emitting signal may keep L-level without generating a pulse.

Therefore, when the third xenon discharge tube 1-3 does not normally flash, the third light-detecting circuit 7-3 may generate the third light-emitting signal having a shorter light-emitting time like T33' than the light-detecting time T output from the output S2 of the timing generator circuit 4 from the output S33 thereof. When the third xenon discharge tube 1-3 does not absolutely flash, the third light-detecting circuit 7-3 may not even generate a pulse (the third light-emitting time T33 become zero). The third signal S3 can be the output signal of the NAND gate 8*c*, in which each of the input signals is the first light-emitting signal having the first light-emitting time T31 output from the output S31 of the first light-detecting circuit 7-1, the second light-emitting signal having the second light-emitting time T32 output from the output S32 of the light-detecting circuit 7-2 and the third light-emitting signal having the third light-emitting time T33 output from the output S33 of the third light-detecting circuit 7-3, respectively.

In addition, the fourth signal S4 can be the output signal of the NAND gate 8, in which each of the input signals is the third signal S3 that can be the output signal of the NAND gate 8*c*, and the light-detecting time T output from the output S2 of the timing generator circuit 4, respectively, as shown in FIG. 4*a*. The forth signal S4 can become a reverse signal of the light-detecting time T because the third signal S3 can become either one of H-level, when the third xenon discharge tube 1-3 does not absolutely flash, or a reverse signal having a shorter L-level time than the light-detecting time T, when the third xenon discharge tube 1-3 does not normally flash as shown FIG. 6.

The fourth signal S4, which is the reverse signal of the light-detecting time T, can be input as the input signal of the latch circuit 9, and thereby the output terminal S5 of the latch circuit 9 can change from L-level to H-level at an arising edge of the light-detecting time T, as shown in FIG. 6. Therefore, when the xenon light source 1, which is composed of the plurality of xenon discharge tubes, does not normally flash or even when at least one of the xenon discharge tubes does not absolutely flash, the output terminal S5 of the latch circuit 9 can change from L-level at a normal operation of the xenon light source 1 to H-level signal so as to be able to provide the devices having shooting with camera with an abnormal operation signal of the xenon light source 1.

In the second embodiment described above, when the xenon light source 1, which is composed of the plurality of xenon discharge tubes, does not normally flash or when at least one of the xenon discharge tubes does not absolutely flash, in a case where an identification of the at least one of degraded xenon discharge tubes including the non-lighting may be desired, the rectangular dotted line region in the second embodiment shown in FIG. 4*a* can be replaced with the block diagram shown in FIG. 4*b*.

The block diagram can include a same number of the circuits, which each includes the latch circuit 9, the NAND gate 8 and the inverter 8*a* in the first embodiment shown in FIG. 2, as the number of the xenon discharge tubes, and each of the circuits can be connected to the first, second and third light-detecting circuits 7-1, 7-2 and 7-3, respectively. Thereby, when the first xenon discharge tube 1-1 does not normally flash or does not absolutely flash, an output terminal S5-1 of a latch circuit 9-1 can provide the devices having shooting with camera with an abnormal operation signal of the xenon discharge tube 1-1. Similarly, when each of the first xenon discharge tubes 1-2 and 1-3 does not normally flash or does not absolutely flash, each of output terminals S5-2 and S5-3 of latch circuits 9-2 and 9-3 can provide the devices having shooting with camera with the abnormal operation signal of the xenon discharge tubes 1-2 and the 1-3, respectively.

Therefore, the disclosed subject matter can provide strobe light units including the detecting circuit without a photo detector, which can reliably detect the degradations including a non-lighting of the xenon light source composed of the single xenon discharge tube, and also can provide strobe light units including the detecting circuit without a photo detector, which can reliably detect degradations including a non-lighting of the xenon light source that is composed of the plurality of xenon discharge tubes.

According to the disclosed subject matter, the strobe lighting unit 10 can flash the first xenon discharge tube 1-1 with the first lighting circuit 6-1, and also can reliably detect the degradations including the non-lighting of the first xenon discharge tube 1-1 by using the first light-detecting circuit 7-1, the timing generator circuit 4 and the logical multiply circuit 8 without a photo detector. Additionally, the degradation data output from the logical multiply circuit 8 can be held by using the latch circuit 9. Moreover, the strobe lighting unit 10A can flash the strobe light source, which is composed of the plurality of xenon discharge tubes, and also can reliably detect the degradations of the strobe light source and a non-lighting of each of the xenon discharge tubes with a simple structure by using the similar methods described above.

Thus, the disclosed subject matter can provide strobe light units with a simple structure that can detect the degradations of the xenon light source without a photo detector, and which can result in an increase in the possible range of devices having the shooting with camera, and therefore can be employed for various devices including a thin mobile phone, a thin smart phone, etc.

Various modifications of the above disclosed embodiments can be made without departing from the spirit and scope of the presently disclosed subject matter. For example, the embodiments are described using the IGBT as the switching elements. However, the IGBT can be replaced with a field-effect transistor (FET), etc. Additionally, as the logical multiply circuit 8, the embodiments are described using the NAND gate, however, an AND gate can be used as the logical multiply circuit 8.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A strobe lighting unit, comprising:
   a xenon discharge tube having at least an anode electrode and a cathode electrode;
   a lighting circuit being connected between the anode electrode and the cathode electrode of the xenon discharge tube, and configured to flash the xenon discharge tube by applying a high voltage between the anode electrode and the cathode electrode of the xenon discharge tube;
   a switching element having at least a gate being connected to the lighting circuit, configured to input an external lighting signal into the gate of the switching element, and configured to operate the lighting circuit so as to flash the xenon discharge tube in accordance with the external light signal input into the gate of the switching element;
   a timing generator having an input and an output configured to receive the external lighting signal into the input of the timing generator, and configured to generate a pulse having a light-detecting time to detect whether the xenon discharge tube normally flashes or not from the output of the timing generator;
   a light-detecting circuit having an input and an output, the input of the light-detecting circuit connecting the anode electrode of the xenon discharge tube, and the light-detecting circuit configured to generate a light-emitting signal from the output of the light-detecting circuit when the xenon discharge tube flashes;
   a logical multiply circuit having an output and inputs, each of the inputs of the logical multiply circuit connecting the output of the timing generator to input the pulse having the light-detecting time and the output of the light-detecting circuit to input the light-emitting signal; and
   wherein the strobe lighting unit monitors a degradation of the xenon discharge tube in accordance with an output signal output from the output of the logical multiply circuit.

2. The strobe lighting unit according to claim 1, further comprising:
   a latch circuit having at least an input and an output, the input of the latch circuit being connected to the output of the logical multiply circuit to input the output signal, and the latch circuit configured to maintain said monitoring signal for the degradation of the xenon discharge tube in the output of the latch circuit.

3. The strobe lighting unit according to claim 1, further comprising:
   a booster circuit connecting to the lighting circuit via a diode.

4. The strobe lighting unit according to claim 1, wherein the switching element is an isolating gate bipolar transistor (IGBT).

5. The strobe lighting unit according to claim 1, wherein the timing generator includes two integrators.

6. The strobe lighting unit according to claim 5, wherein each of the two integrators is composed of a resistance and a capacitor, and at least one of outputs of the two integrators is connected to a waveform shaping circuit.

7. The strobe lighting unit according to claim 1, wherein the light-detecting circuit includes a capacitor and the capacitor connects to the anode of the xenon discharge tube to detect a flash of the xenon discharge tube.

8. The strobe lighting unit according to claim 7, wherein the light-detecting circuit includes a bipolar transistor and a collector of the bipolar transistor is the output of the light-detecting circuit.

9. The strobe lighting unit according to claim 1, wherein the light-detecting circuit monitors a falling edge of the anode of the xenon discharge tube to detect the degradation of the xenon discharge tube.

10. A strobe lighting unit, comprising:
    a strobe light source including a plurality of xenon discharge tubes each having at least an anode electrode and a cathode electrode;
    a plurality of lighting circuits each being connected between the anode electrode and the cathode electrode of a respective one of the xenon discharge tubes of the strobe light source and configured to flash the respective one of the xenon discharge tubes by applying a high voltage between the anode electrode and the cathode electrode of the respective one of the xenon discharge tubes;

a plurality of switching elements each having at least a gate being connected to a respective one of the lighting circuits, each of the switching elements configured to input an external lighting signal into the gate of the switching element, and configured to operate the respective one of lighting circuits so as to flash the respective one of the xenon discharge tubes of the strobe light source in accordance with the external light signal input into the gate of the switching element;

a timing generator having an input and an output configured to receive the external lighting signal into the input of the timing generator, and configured to generate a pulse having a light-detecting time to detect whether the strobe light source normally flashes or not from the output of the timing generator;

a plurality of light-detecting circuits each having an input and an output, each of the inputs of the light-detecting circuits connecting the anode electrode of the respective one of the xenon discharge tubes of the strobe light source, and each of the light-detecting circuits configured to generate a light-emitting signal from the output of the light-detecting circuit when the respective one of the xenon discharge tubes of the strobe light source flashes;

a logical multiply circuit having an output and inputs, each of the inputs of the logical multiply circuit connecting the output of the timing generator to input the pulse having the light-detecting time and each of the outputs of the light-detecting circuits to input the light-emitting signal, respectively; and wherein the strobe lighting unit monitors a degradation of the strobe light source in accordance with an output signal output from the output of the logical multiply circuit.

11. The strobe lighting unit according to claim 10, further comprising:
a latch circuit having at least an input and an output, the input of the latch circuit being connected to the output of the logical multiply circuit to input the output signal, and the latch circuit configured to maintain said monitoring signal for the degradation of the xenon light source in the output of the latch circuit.

12. The strobe lighting unit according to claim 10, further comprising:
a booster circuit connecting to the lighting circuit via a diode.

13. The strobe lighting unit according to claim 10, wherein the switching element is an IGBT.

14. The strobe lighting unit according to claim 10, wherein the timing generator includes two integrators.

15. The strobe lighting unit according to claim 14, wherein each of the two integrators is composed of a resistance and a capacitor, and at least one of outputs of the two integrators is connected to a waveform shaping circuit.

16. The strobe lighting unit according to claim 10, wherein each of the light-detecting circuits includes a capacitor and the capacitor connects to the anode of the respective one of the xenon discharge tubes of the strobe light source to detect a flash of the respective one of the xenon discharge tubes.

17. The strobe lighting unit according to claim 16, wherein each of the light-detecting circuits includes a bipolar transistor and a collector of the bipolar transistor is the output of each of the light-detecting circuit.

18. The strobe lighting unit according to claim 10, wherein each of the light-detecting circuits monitors a falling edge of the anode of the respective one of the xenon discharge tubes of the xenon light source to detect the degradation of the xenon light source.

19. The strobe lighting unit according to claim 10, wherein the logical multiply circuit includes a plurality of logical multiply elements each having an output and inputs, each of the inputs of the logical multiply elements connects the output of the timing generator to input the pulse having the light-detecting time and a respective one of the outputs of the light-detecting circuits to input the light-emitting signal, respectively.

20. The strobe lighting unit according to claim 19, further comprising:
a plurality of latch circuits each having at least an input and an output, each input of the latch circuits being connected to a respective one of the outputs of the logical multiply elements to input the output signal, and each of the latch circuits configured to maintain said monitoring signal for each degradation of the xenon discharge tubes in each output of the latch circuits.

* * * * *